United States Patent
Dzhuraeva et al.

(10) Patent No.: US 11,983,104 B2
(45) Date of Patent: May 14, 2024

(54) VALIDATION OF A MACHINE LEARNING MODEL

(71) Applicant: Cisco Technology, Inc., San Jose, CA (US)

(72) Inventors: Elvira Dzhuraeva, San Jose, CA (US); Patrick James Riel, Concord, CA (US); Xinyuan Huang, San Jose, CA (US); Ashutosh Arwind Malegaonkar, Milpitas, CA (US)

(73) Assignee: Cisco Technology, Inc., San Jose, CA (US)

(*) Notice: Subject to any disclaimer, the term of this patent is extended or adjusted under 35 U.S.C. 154(b) by 157 days.

(21) Appl. No.: 17/582,997

(22) Filed: Jan. 24, 2022

(65) Prior Publication Data

US 2023/0236960 A1    Jul. 27, 2023

(51) Int. Cl.
*G06F 11/36*    (2006.01)
(52) U.S. Cl.
CPC .............................. *G06F 11/3692* (2013.01)
(58) Field of Classification Search
CPC .................................................. G06F 11/3692
See application file for complete search history.

(56) References Cited

U.S. PATENT DOCUMENTS

| | | | |
|---|---|---|---|
| 11,010,286 B1* | 5/2021 | Goksu | G06F 11/3688 |
| 2018/0314975 A1 | 11/2018 | Zang et al. | |
| 2021/0012404 A1 | 1/2021 | Kannan et al. | |
| 2021/0019661 A1 | 1/2021 | Bos et al. | |
| 2021/0019665 A1 | 1/2021 | Gur et al. | |
| 2021/0073685 A1 | 3/2021 | Veshchikov et al. | |
| 2022/0018221 A1* | 1/2022 | Zhang | E21B 43/00 |

FOREIGN PATENT DOCUMENTS

KR        102251807 B1 *   5/2021

* cited by examiner

*Primary Examiner* — Nadeem Iqbal
(74) *Attorney, Agent, or Firm* — Polsinelli P.C.

(57) ABSTRACT

Systems, methods, and computer-readable media are disclosed for validating a machine learning model. In one aspect, a machine learning model validation system can receive a test machine learning model, analyze an output of the test machine learning model, determine a degree of similarity between the test machine learning model and one or more machine learning models stored in a database based on the output of the test machine learning model, and determining whether the test machine learning model complies with a set of validation rules based on the degree of the similarity with respect to one or more thresholds.

20 Claims, 6 Drawing Sheets

VALIDATION OF A MACHINE LEARNING MODEL

TECHNICAL FIELD

The present technology pertains to a machine learning model, and more specifically to validating a machine learning model based on a comparison against a plurality of machine learning models.

BACKGROUND

Machine learning (ML) has been increasingly used for various tasks across a wide variety of industries that used to be manually done by humans. Specifically, ML has automated such tasks through algorithms that draw on large amount of data. ML is the application of artificial intelligence technology that allows applications to become more accurate at predicting outcomes. In general, ML involves the use of machine learning models, which can be trained or otherwise configured to recognize certain types of patterns and predict outcomes based on input data. For example, machine learning models can be implemented to apply complex computations to input data to generate various types of output.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which.

DETAILED DESCRIPTION

Figure 1A:
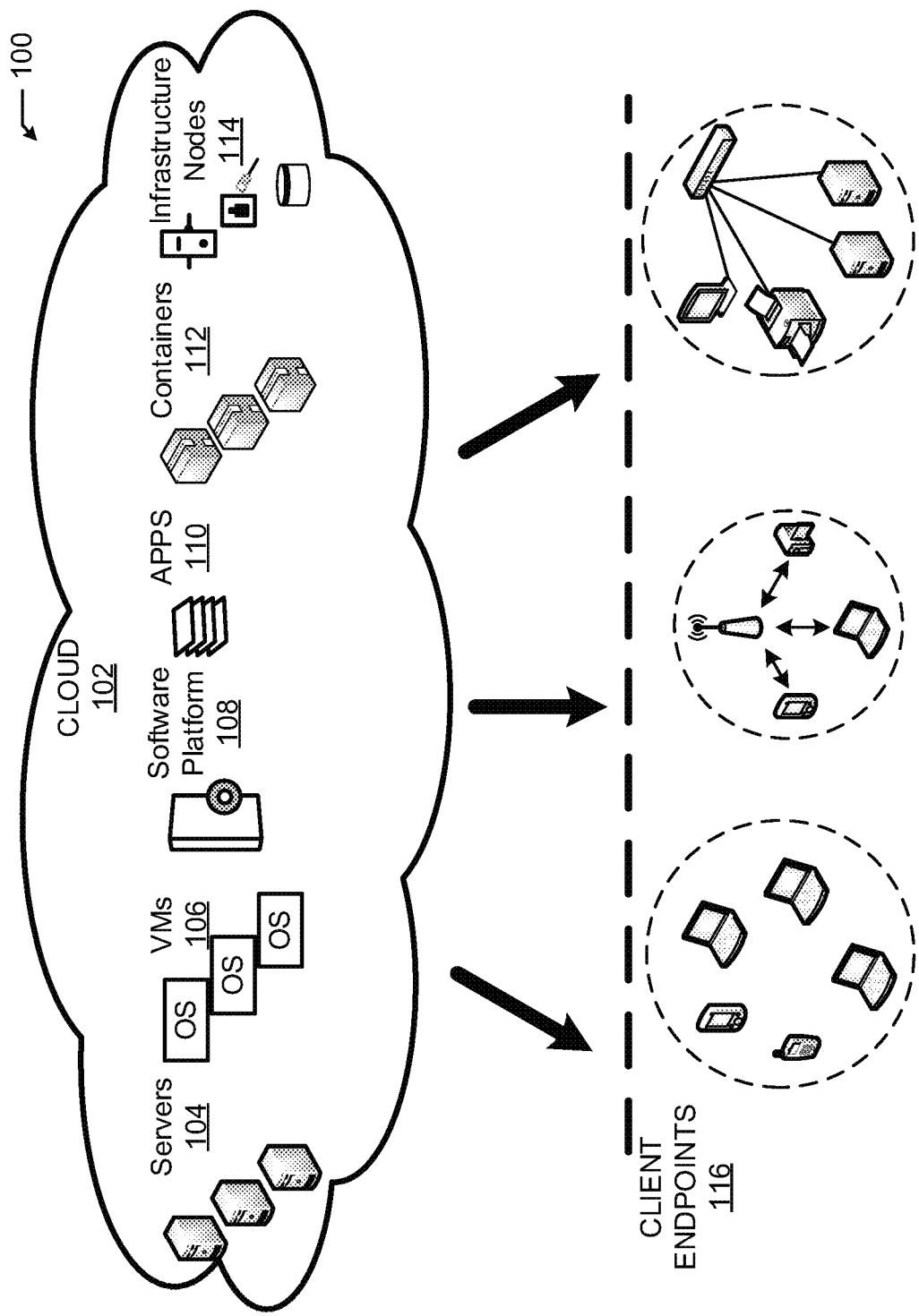
FIG. 1A illustrates an example cloud computing architecture.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Disclosed herein are systems, methods, and computer-readable media for validating a machine learning model through comparing it against a plurality of other machine learning models.

In one aspect, a method of validating a machine learning model includes receiving a test machine learning model, analyzing an output of the test machine learning model, determining a degree of similarity between the test machine learning model and one or more machine learning models stored in a database based on the output of the test machine learning model, and determining whether the test machine learning model complies with a set of validation rules based on the degree of the similarity with respect to one or more thresholds.

In another aspect, the one or more machine learning models are a plurality of machine learning models and the test machine learning model is compared against each of the plurality of machine learning models simultaneously.

In another aspect, the output of the test machine learning model is in the form of a vector.

In another aspect, the determining the degree of the similarity between the test machine learning model and the one or more machine learning models includes determining a distance between the vector of the test machine learning model and a vector associated with the one or more machine learning models.

In another aspect, the output of the test machine learning model is based on metadata associated with the test machine learning model where the metadata comprises one or a combination of a description tag, a classification of the test machine learning model, and model configurations.

In another aspect, the test machine learning model and the one or more machine learning models stored in the database are compared in a cloud environment that is remote from one or more devices in which the test machine learning model can be deployed for actually implementing the test machine learning model.

In another aspect, the test machine learning model is one of an object detection model, a motion detection model, a facial recognition model, or an audio detection model.

In one aspect, a system for validating a machine learning model includes one or more computer-readable media comprising computer-readable instructions and one or more processors. The one or more processors are configured to execute the computer-readable instructions to receive a test machine learning model, analyze an output of the test machine learning model, determine a degree of similarity between the test machine learning model and one or more machine learning models stored in a database based on the output of the test machine learning model, and whether the test machine learning model complies with a set of validation rules based on the degree of the similarity with respect to one or more thresholds.

In one aspect, one or more non-transitory computer-readable media include computer-readable instructions, which when executed by one or more processors, cause the processors to receive a test machine learning model, analyze an output of the test machine learning model, determine a degree of similarity between the test machine learning model and one or more machine learning models stored in a database based on the output of the test machine learning model, and whether the test machine learning model complies with a set of validation rules based on the degree of the similarity with respect to one or more thresholds.

Description of Example Embodiments

As noted, machine learning models have been increasingly implemented in a wide variety of applications and run on various types of devices. With many of the complex and intensive tasks for which machine learning models are employed, machine learning models need to be developed and verified to ensure the quality and adequacy of the model. More specifically, the machine learning model should be validated, prior to being run on a device, that the machine learning model can provide satisfactory outcomes to its input data, e.g. within any limits that may be set for the device. In particular, different applications and/or devices may have a different set of rules (e.g., enterprise rules) in terms of their intended purposes, safety or security related matters, or any policy reasons. In general, machine learning model validation relates to the process where a trained model is evaluated with respect to a set of required rules with a testing data set.

Therefore, there exists a need for a machine learning model validation system that can ensure that the machine learning model is performing as it should within an applicable set of rules. The present technology includes systems, methods, and computer-readable media for solving the foregoing problems and discrepancies, among others. In some examples, systems, methods, and computer-readable media are provided for validating a machine learning model by comparing the machine learning model with a plurality of machine learning models based on outputs of the machine learning model.

FIG. 1A illustrates a diagram of an example cloud computing architecture 100. The architecture can include a cloud 102. The cloud 102 can include one or more private clouds, public clouds, and/or hybrid clouds. Moreover, the cloud 102 can include cloud elements 104-114. The cloud elements 104-114 can include, for example, servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can provide various cloud computing services via the cloud elements 104-114, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102. The client endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

The client endpoints 116 can communicate with the elements 104-114 as part of accessing network services through infrastructure intermediation messaging. Specifically, communications between the elements 104-114 and the client endpoints 116 can be managed and otherwise controlled through a network infrastructure between the client endpoints 116 and the cloud 102. For example, any of a 5G infrastructure, an LTE infrastructure and a Wi-Fi infrastructure can communicate a physical location of a client endpoint to a cloud service. In turn, the cloud service can cause the infrastructure to send specific signaling to the client endpoint for accessing network services through the cloud service. For example, the cloud service can use the LTE infrastructure, e.g. through an LTE S14 interface, to alert the client endpoint of Wi-Fi availability through the Wi-Fi infrastructure. In another example, the cloud service can use the Wi-Fi infrastructure, e.g. through MBO Wi-Fi messaging, to alert the client endpoint of LTE availability through the LTE infrastructure.

Figure 1B:
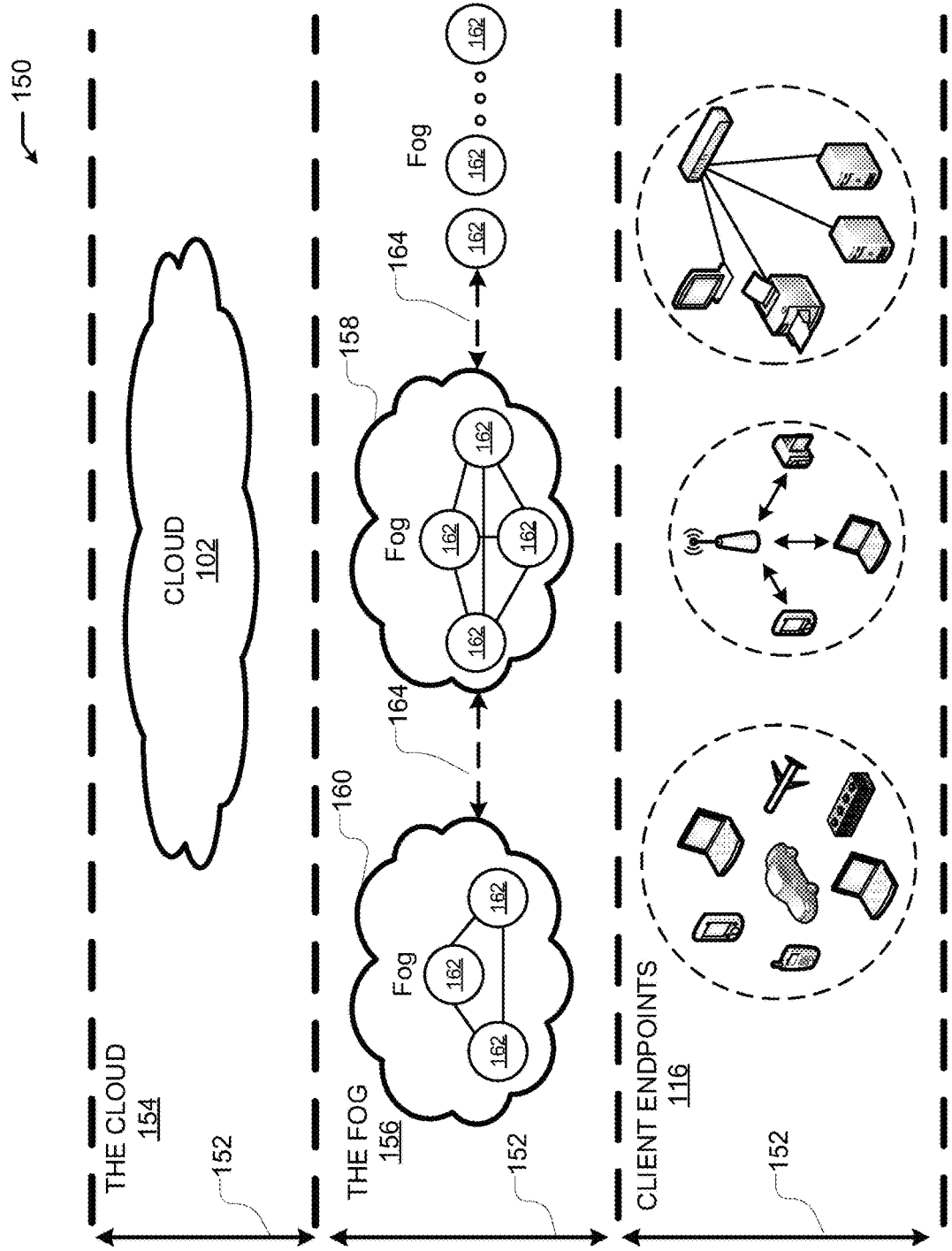
FIG. 1B illustrates an example fog computing architecture.

FIG. 1B illustrates a diagram of an example fog computing architecture 150. The fog computing architecture 150 can include the cloud layer 154, which includes the cloud 102 and any other cloud system or environment, and the fog layer 156, which includes fog nodes 162. The client endpoints 116 can communicate with the cloud layer 154 and/or the fog layer 156. The architecture 150 can include one or more communication links 152 between the cloud layer 154, the fog layer 156, and the client endpoints 116. Communications can flow up to the cloud layer 154 and/or down to the client endpoints 116.

The fog layer 156 or "the fog" provides the computation, storage and networking capabilities of traditional cloud networks, but closer to the endpoints. The fog can thus extend the cloud 102 to be closer to the client endpoints 116. The fog nodes 162 can be the physical implementation of fog networks. Moreover, the fog nodes 162 can provide local or regional services and/or connectivity to the client endpoints 116. As a result, traffic and/or data can be offloaded from the cloud 102 to the fog layer 156 (e.g., via fog nodes 162). The fog layer 156 can thus provide faster services and/or connectivity to the client endpoints 116, with lower latency, as well as other advantages such as security benefits from keeping the data inside the local or regional network (s).

The fog nodes 162 can include any networked computing devices, such as servers, switches, routers, controllers, cameras, access points, gateways, etc. Moreover, the fog nodes 162 can be deployed anywhere with a network connection, such as a factory floor, a power pole, alongside a railway track, in a vehicle, on an oil rig, in an airport, on an aircraft, in a shopping center, in a hospital, in a park, in a parking garage, in a library, etc.

In some configurations, one or more fog nodes 162 can be deployed within fog instances 158, 160. The fog instances 158, 160 can be local or regional clouds or networks. For example, the fog instances 158, 160 can be a regional cloud or data center, a local area network, a network of fog nodes 162, etc. In some configurations, one or more fog nodes 162 can be deployed within a network, or as standalone or individual nodes, for example. Moreover, one or more of the fog nodes 162 can be interconnected with each other via links 164 in various topologies, including star, ring, mesh or hierarchical arrangements, for example.

In some cases, one or more fog nodes 162 can be mobile fog nodes. The mobile fog nodes can move to different geographic locations, logical locations or networks, and/or fog instances while maintaining connectivity with the cloud layer 154 and/or the endpoints 116. For example, a particular fog node can be placed in a vehicle, such as an aircraft or train, which can travel from one geographic location and/or logical location to a different geographic location and/or logical location. In this example, the particular fog node may connect to a particular physical and/or logical connection point with the cloud 154 while located at the starting location and switch to a different physical and/or logical connection point with the cloud 154 while located at the destination location. The particular fog node can thus move within particular clouds and/or fog instances and, therefore, serve endpoints from different locations at different times.

Figure 2A:
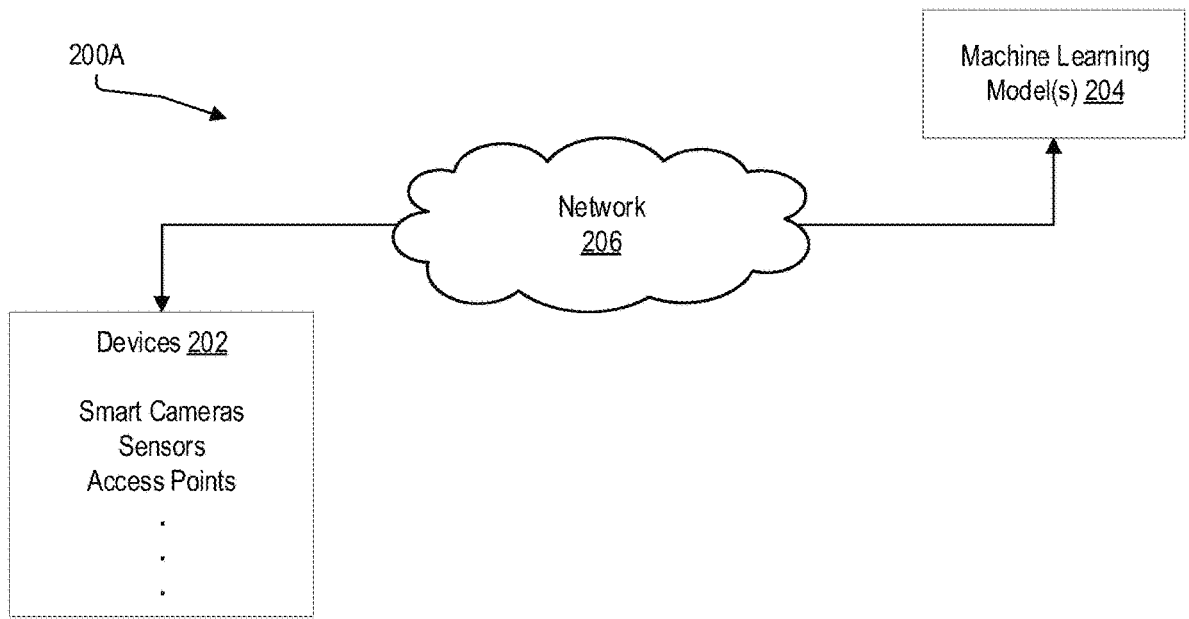
FIG. 2A illustrates a diagram of an example network environment according to some examples of the present disclosure.

FIG. 2A illustrates a diagram of an example network environment 200A according to some examples of the present disclosure. According to some examples, network environment 200A comprises devices 202, machine learning model(s) 204, and network 206.

In some instances, machine learning models 204 can be uploaded to each of devices 202 through network 206 and run on devices 202. Also, machine learning models 204 may be created or trained by each of devices 202. For example, each of devices 202 may collect data through its sensor and train machine learning models 204 based on the collected data as input data.

Examples of devices 202 can include but are not limited to, smart cameras (e.g., cloud-managed smart cameras), sensors, access points, or any suitable device that is capable of implementing machine learning models 204.

In some examples, machine learning models 204 can be stored in a server. Devices 202 can communicate through network 206 with the server that includes machine learning models 204.

In some instances, network 206 is a public network such as the Internet. In other cases, network 206 can be any other applicable public or private network.

Figure 2B:
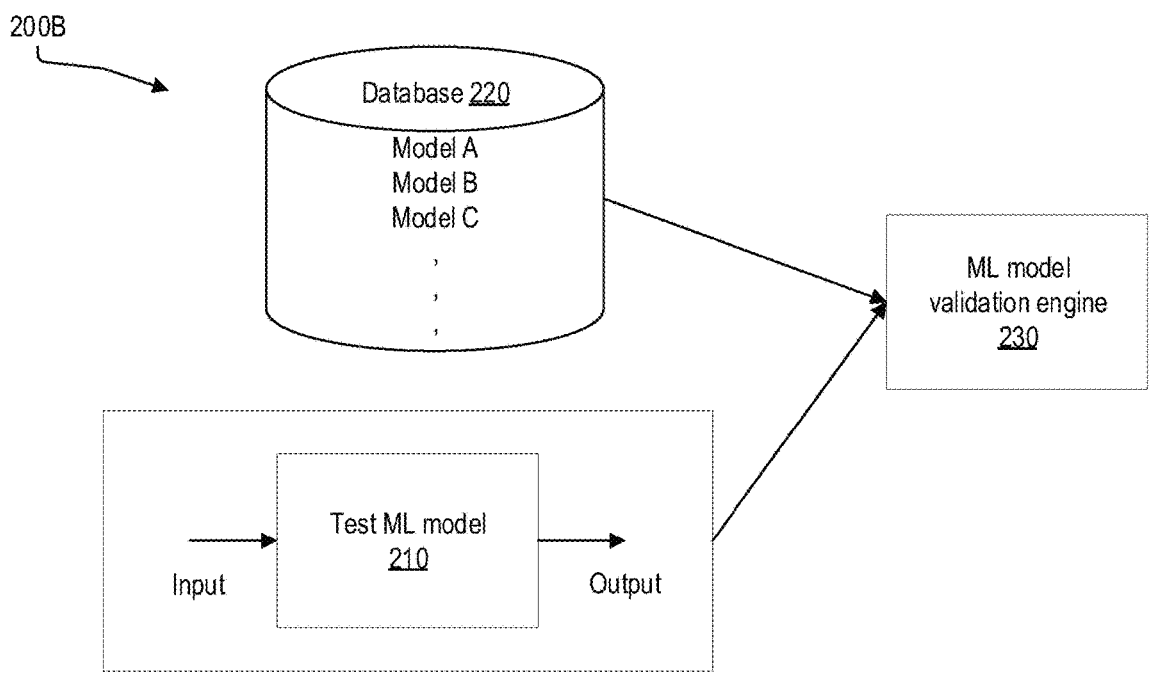
FIG. 2B illustrates a diagram of an example machine learning model validation system according to some examples of the present disclosure.

FIG. 2B illustrates a diagram of an example machine learning (ML) model validation system 200B according to some examples of the present disclosure. According to some examples, ML model validation system 200B comprises test ML model 210, which needs to be validated, database 220 comprising a plurality of ML models (e.g., model A, model B, model C, etc.), and ML model validation engine 230.

In some instances, test ML model 210 is one or a combination of an object detection model, a motion detection model, a facial recognition model, an audio detection model, a temperature detection model, or any applicable machine learning model.

In some examples, test ML model 210 can be uploaded onto a device (e.g., devices 202 as illustrated in FIG. 2A) and trained to produce output data based on input data. In some instances, database 220 stores the plurality of ML models that have been already validated, more specifically, with respect to the set of validation rules.

In some examples, ML model validation engine 230 can identify test ML model 210 that needs to be validated. The validation of test ML model 210 is to ensure that test ML model 210 is in compliance with any validation rules. In some examples, such validation rules can include various enterprise rules that may be required by each device before test ML model 210 is implemented on a device (e.g., devices 202 as illustrated in FIG. 2A). For example, some entities might not want their devices to run a machine learning model that performs face recognition for privacy reasons. During the validation process, ML model validation engine 230 can determine whether test ML model 210 performs any face recognition.

In some examples, ML model validation engine 230 can analyze the output data that is produced by training test ML model 210. In some instances, the output data can include metadata associated with the output data. For example, the metadata can include a description tag, a classification of test ML model 210, test ML model configurations, or any other information associated with test ML model 210.

In some aspects, ML model validation engine 230 can compare the output data from test ML model 210 against the plurality of ML models stored in database 220 to determine similarity. The similarity relates to the set of validation rules. Further, ML model validation engine 230 can determine whether a degree of similarity is above a predetermined threshold. A degree of similarity can include a numerical term or other applicable quantity that quantifies or qualifies differences between ML models, e.g. based on output.

If the degree of similarity is above the predetermined threshold, ML model validation engine 230 can determine that test ML model 210 complies with the set of validation rules. For example, by comparing test ML model 210 against other ML model that has been validated in terms of the validation rules, ML model validation engine 230 can determine that test ML model 210 complies with the validation rules if the output of test ML model 210 is similar enough to other validated ML model. While reference is made throughout this description to the degree of similarity being above a predetermined threshold, the technology, as described herein, can be applied based on an applicable position of the degree of similarity with respect to a threshold. For example, ML model validation engine 230 can determine that test ML model 210 complies with the set of validation rules if it is below the threshold.

In some examples, the output data is in the form of a vector. For the comparison between test ML model 210 and the plurality of ML models stored in database 220, ML model validation engine 230 can calculate the distance between two vectors. The vectors can include one vector generated based on the output produced via test ML model 210 and another vector generated based on one of the plurality of ML models stored in database 220. Based on the distance between the vectors, e.g. if the distance is shorter than a predetermined range, ML model validation engine 230 can determine that the degree of similarity is above the predetermined threshold and therefore test ML model 210 satisfies the validation rules.

In some aspects, ML model validation engine 230 can perform the validation (i.e., the comparison between test ML model 210 and the plurality of ML models stored in database 220) in the cloud prior to downloading test ML model 210 onto a device (e.g., devices 202 as illustrated in FIG. 2A). Since cloud can have a large number of graphic processing units (GPUs), test ML model 210 can be compared simultaneously against an applicable combination of multiple ML models in database 220 (e.g., a combination of a face recognition model and an audio detection model).

Figure 3:
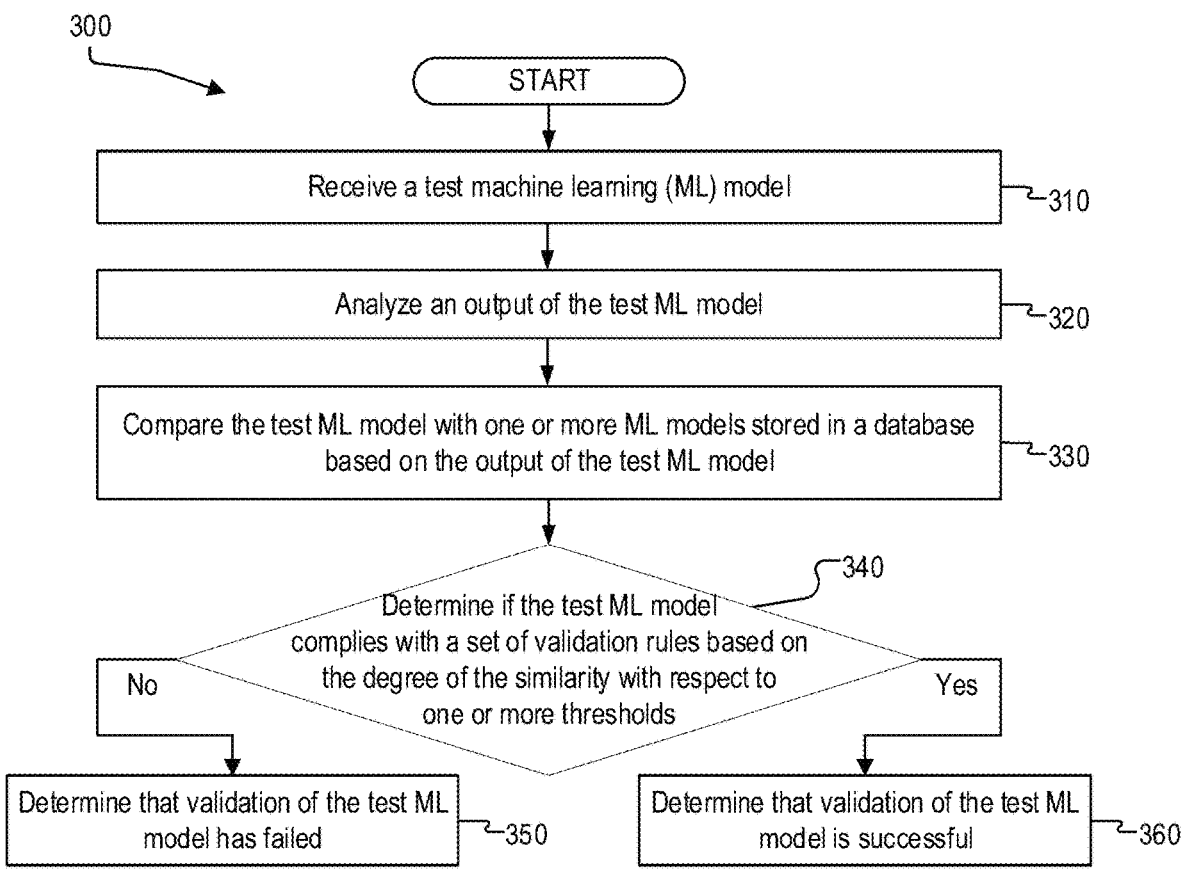
FIG. 3 illustrates a flowchart of a method of validating a machine learning model according to some examples of the present disclosure.

FIG. 3 is a flowchart of method 300 for validating a machine learning model according to some examples of the present disclosure. Although example method 300 depicts a particular sequence of operations, the sequence may be altered without departing from the scope of the present disclosure. For example, some of the operations depicted may be performed in parallel or in a different sequence that does not materially affect the function of method 300. In other examples, different components of an example device or system that implements the method 300 may perform functions at substantially the same time or in a specific sequence.

According to some examples, method 300 includes receiving a test machine learning model at step 310. For example, ML model validation system 200B can receive test ML model 210 as illustrated in FIG. 2A.

In some examples, the test ML model can be one or a combination of an object detection model, a motion detection model, a facial recognition model, an audio detection model, and any applicable ML model.

Prior to being implemented to devices 202 via network 206 as illustrated in FIG. 2A, test ML model 210 can be validated by ML model validation system 200B to confirm the adequacy of the model (e.g., whether the model complies with a set of validation rules).

According to some examples, method 300 includes analyzing an output of the test machine learning model at step 320. For example, ML model validation system 200B can analyze the output of test ML model 210 as illustrated in FIG. 2B.

According to some examples, method 300 includes comparing the test ML model with one or more ML models stored in a database based on the output of the test ML model at step 330. Without having to analyze the details of the test ML model (e.g., source code), method 300 in accordance with the present disclosure enables the validation process based on analyzing the output of the test ML model.

In some examples, such comparison can include determining a degree of similarity between the test machine learning model and one or more machine learning models stored in a database based on the output of the test machine learning model. For example, ML model validation system 200B can compare test ML model 210 against one or more ML models (e.g., models A, B, C, etc. stored in database 220) as illustrated in FIG. 2A to determine similarity (e.g., a degree of similarity between test ML model 210 and one or more ML models stored in database 220). In some examples, the degree of the similarity can include a numerical term or other applicable quantity that quantifies or qualifies differences between ML models, e.g., based on the output data.

Further, at step 340, method 300 includes determining whether the test ML model complies with a set of validation rules based on the degree of the similarity with respect to one or more thresholds at step 340. For example, ML model validation engine 230 as illustrated in FIG. 2B can determine whether test ML model 210 complies with a set of validation rules based on the degree of the similarity with respect to one or more thresholds.

If the test ML model fails to comply with a set of validation rules based on the degree of the similarity with respect to one or more thresholds, at step 350, method 300 includes determining that the test ML model does not comply with the set of validation rules and has failed the validation test.

If the test ML model complies with a set of validation rules based on the degree of the similarity with respect to one or more thresholds, at step 360, method 300 includes determining that the test machine learning model has passed the validation process. For example, if the degree of the similarity is equal to or above a predetermined threshold, ML model validation system 200B can determine that test ML model 210 complies with the set of validation rules.

As noted above, the present technology, as described herein, can be applied based on an applicable position of the degree of the similarity with respect to one or more thresholds. In some examples, ML model validation engine 230 can determine that test ML model 210 complies with the set of validation rules if the degree of the similarity is above or equal to the threshold. In other examples, ML model validation engine 230 can determine that test ML model 210 complies with the set of validation rules if the degree of the similarity is below or equal to the threshold.

According to some examples, the comparison between the test ML model and the plurality of the ML models stored in the database can be performed in cloud.

In some examples, the test ML model can be compared against each of the plurality of ML models stored in the database simultaneously. For example, the test ML model can be associated with more than one detection model such as a combination of a facial recognition model and an audio detection model. The test ML model then can be compared against each of the plurality of ML models stored in the database at the same time to determine if each of the facial recognition model and the audio detection model complies with the set of validation rules.

According to some examples, the output of the test ML model is in the form of a vector. In such case, the degree of the similarity between the test ML model and the plurality of the ML models stored in the database can be determined by calculating the distance between two vectors, one vector representing the output of the test ML model and another vector representing the output of one of the plurality of the ML models stored in the database.

For example, if the distance between those two vectors is shorter than a predetermined range (i.e., close enough), According to some examples, the output of the test ML model can be based on metadata. Examples of the metadata can include, but are not limited to, a description tag, a classification of the test ML model, and model configurations.

Figure 4:
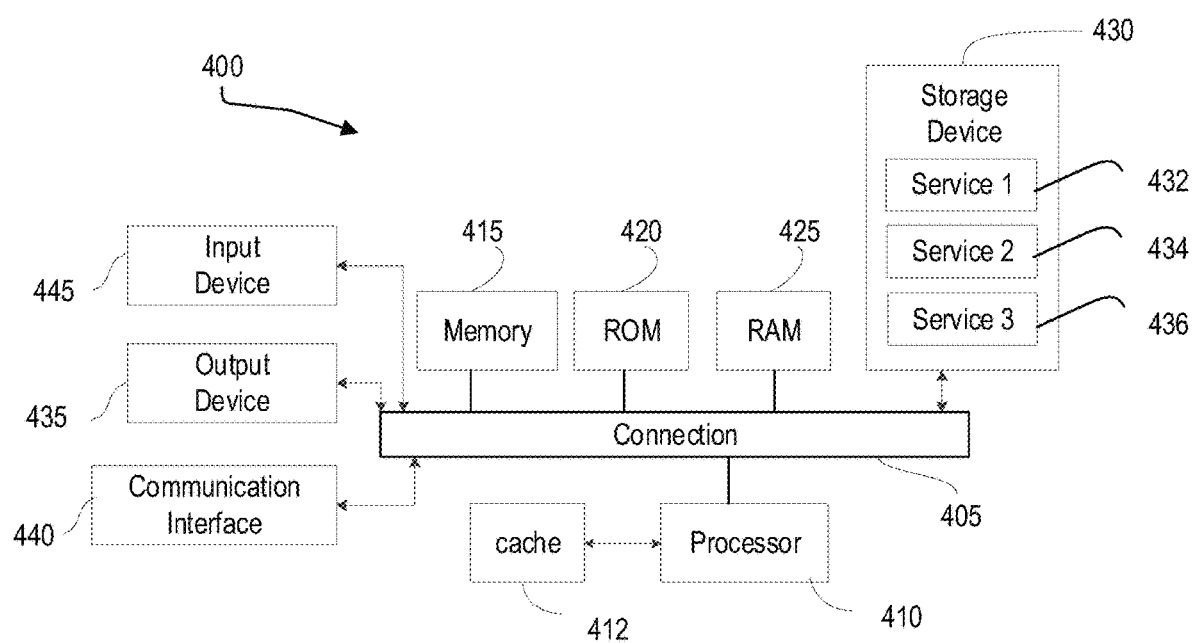
FIG. 4 shows an example computing system, which can be for example any computing device that can implement components of the system.

FIG. 4 illustrates an example computing system 400 including components in electrical communication with each other using a connection 405 upon which one or more aspects of the present disclosure can be implemented. Connection 405 can be a physical connection via a bus, or a direct connection into processor 410, such as in a chipset architecture. Connection 405 can also be a virtual connection, networked connection, or logical connection.

In some embodiments computing system 400 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 400 includes at least one processing unit (CPU or processor) 410 and connection 405 that couples various system components including system memory 415, such as read only memory (ROM) 420 and random access memory (RAM) 425 to processor 410. Computing system 400 can include a cache of high-speed memory 412 connected directly with, in close proximity to, or integrated as part of processor 410.

Processor 410 can include any general purpose processor and a hardware service or software service, such as services 432, 434, and 436 stored in storage device 430, configured to control processor 410 as well as a special-purpose processor where software instructions are incorporated into the actual processor design. Processor 410 may essentially be a completely self-contained computing system, containing multiple cores or processors, a bus, memory controller, cache, etc. A multi-core processor may be symmetric or asymmetric.

To enable user interaction, computing system 400 includes an input device 445, which can represent any number of input mechanisms, such as a microphone for speech, a touch-sensitive screen for gesture or graphical input, keyboard, mouse, motion input, speech, etc. Computing system 400 can also include output device 435, which can be one or more of a number of output mechanisms known to those of skill in the art. In some instances, multimodal systems can enable a user to provide multiple types of input/output to communicate with computing system 400. Computing system 400 can include communications interface 440, which can generally govern and manage the user input and system output. There is no restriction on operating on any particular hardware arrangement and therefore the basic features here may easily be substituted for improved hardware or firmware arrangements as they are developed.

Storage device 430 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 430 can include software services, servers, services, etc., that when the code that defines such software is executed by the processor 410, it causes the system to perform a function. In some embodiments, a hardware service that performs a particular function can include the software component stored in a computer-readable medium in connection with the necessary hardware components, such as processor 410, connection 405, output device 435, etc., to carry out the function.

Figure 5:
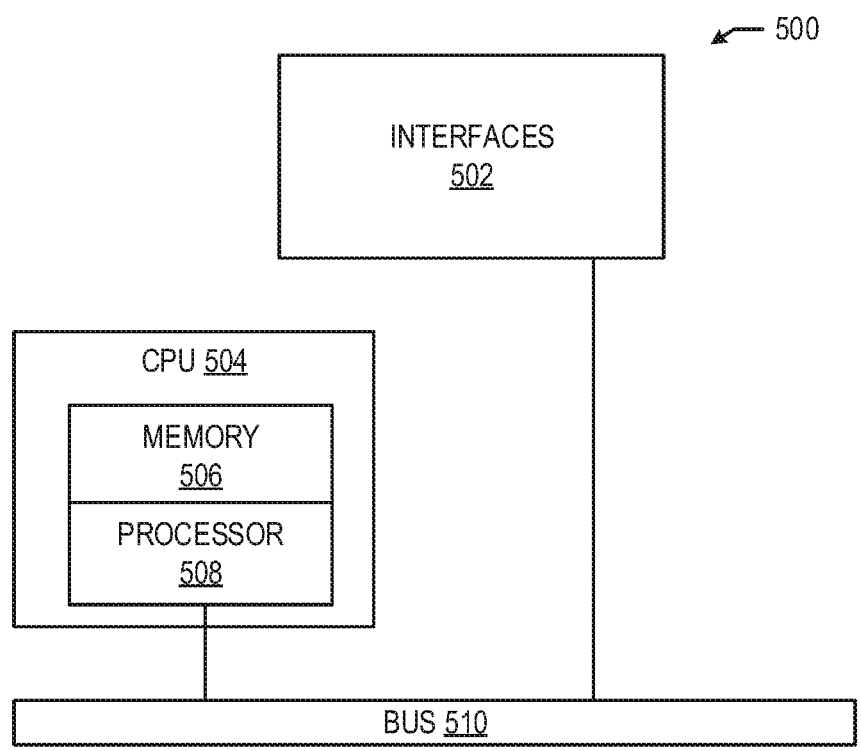
FIG. 5 illustrates an example network device.

FIG. 5 illustrates an example network device 500 suitable for performing switching, routing, load balancing, and other networking operations. Network device 500 includes a central processing unit (CPU) 504, interfaces 502, and a bus 510 (e.g., a PCI bus). When acting under the control of appropriate software or firmware, the CPU 504 is responsible for executing packet management, error detection, and/or routing functions. The CPU 504 preferably accomplishes all these functions under the control of software including an operating system and any appropriate applications software. CPU 504 may include one or more processors 508, such as a processor from the INTEL X86 family of microprocessors. In some cases, processor 508 can be specially designed hardware for controlling the operations of network device 500. In some cases, a memory 506 (e.g., non-volatile RAM, ROM, etc.) also forms part of CPU 504. However, there are many different ways in which memory could be coupled to the system.

The interfaces 502 are typically provided as modular interface cards (sometimes referred to as "line cards"). Generally, they control the sending and receiving of data packets over the network and sometimes support other peripherals used with the network device 500. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master CPU 504 to efficiently perform routing computations, network diagnostics, security functions, etc.

Although the system shown in FIG. 5 is one specific network device of the present technology, it is by no means the only network device architecture on which the present technology can be implemented. For example, an architecture having a single processor that handles communications as well as routing computations, etc., is often used. Further, other types of interfaces and media could also be used with the network device 500.

Regardless of the network device's configuration, it may employ one or more memories or memory modules (including memory 506) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 506 could also hold various software containers and virtualized execution environments and data.

The network device 500 can also include an application-specific integrated circuit (ASIC), which can be configured to perform routing and/or switching operations. The ASIC can communicate with other components in the network device 500 via the bus 510, to exchange data and signals and coordinate various types of operations by the network device 500, such as routing, switching, and/or data storage operations, for example.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A method comprising:
   determining whether one or more machine learning models complies with a set of validation rules;
   storing, in response to the determining, the one or more machine learning models;
   receiving a test machine learning model;
   analyzing an output of the test machine learning model;
   determining a degree of similarity between the test machine learning model and at least some of the one or more machine learning models stored in a database based on the output of the test machine learning model; and
   determining whether the test machine learning model complies with the set of validation rules based on the degree of the similarity with respect to one or more thresholds.

2. The method of claim 1, wherein the one or more machine learning models are a plurality of machine learning models and wherein the test machine learning model is compared against each of the plurality of machine learning models simultaneously.

3. The method of claim 1, wherein the output of the test machine learning model is in the form of a vector.

4. The method of claim 3, wherein the determining the degree of the similarity between the test machine learning model and the one or more machine learning models includes determining a distance between the vector of the test machine learning model and a vector associated with the one or more machine learning models.

5. The method of claim 1, wherein the output of the test machine learning model is based on metadata associated with the test machine learning model, the metadata comprising one or a combination of a description tag, a classification of the test machine learning model, and model configurations.

6. The method of claim 1, wherein the test machine learning model and the one or more machine learning models stored in the database are compared in a cloud environment that is remote from one or more devices in which the test machine learning model can be deployed for actually implementing the test machine learning model.

7. The method of claim 1, wherein the test machine learning model is one or a combination of an object detection model, a motion detection model, a facial recognition model, and an audio detection model.

8. A system comprising:
one or more processors; and
a computer-readable medium comprising instructions stored therein, which when executed by the one or more processors, cause the one or more processors to:
determine whether one or more machine learning models complies with a set of validation rules;
store, in response to the determining, the one or more machine learning models;
receive a test machine learning model;
analyze an output of the test machine learning model;
determine a degree of similarity between the test machine learning model and at least some of the one or more machine learning models stored in a database based on the output of the test machine learning model; and
determine whether the test machine learning model complies with the set of validation rules based on the degree of the similarity with respect to one or more thresholds.

9. The system of claim 8, wherein the one or more machine learning models are a plurality of machine learning models and wherein the test machine learning model is compared against each of the plurality of machine learning models simultaneously.

10. The system of claim 8, wherein the output of the test machine learning model is in the form of a vector.

11. The system of claim 10, wherein the instructions to determine the degree of the similarity between the test machine learning model and the one or more machine learning models includes the instructions to determine a distance between the vector of the test machine learning model and a vector associated with the one or more machine learning models.

12. The system of claim 8, wherein the output of the test machine learning model is based on metadata associated with the test machine learning model, the metadata comprising one or a combination of a description tag, a classification of the test machine learning model, and model configurations.

13. The system of claim 8, wherein the test machine learning model and the one or more machine learning models stored in the database are compared in a cloud environment that is remote from one or more devices in which the test machine learning model can be deployed for actually implementing the test machine learning model.

14. The system of claim 8, wherein the test machine learning model is one or a combination of an object detection model, a motion detection model, a facial recognition model, and an audio detection model.

15. A non-transitory computer-readable storage medium comprising computer-readable instructions, which when executed by a computing system, cause the computing system to:
determine whether one or more machine learning models complies with a set of validation rules;
store, in response to the determining, the one or more machine learning models;
receive a test machine learning model;
analyze an output of the test machine learning model;
determine a degree of similarity between the test machine learning model and at least some of the one or more machine learning models stored in a database based on the output of the test machine learning model; and
determine whether the test machine learning model complies with the set of validation rules based on the degree of the similarity with respect to one or more thresholds.

16. The non-transitory computer-readable storage medium of claim 15, wherein the one or more machine learning models are a plurality of machine learning models and wherein the test machine learning model is compared against each of the plurality of machine learning models simultaneously.

17. The non-transitory computer-readable storage medium of claim 15, wherein the output of the test machine learning model is in the form of a vector.

18. The non-transitory computer-readable storage medium of claim 17, wherein the instructions to determine the degree of the similarity between the test machine learning model and the one or more machine learning models includes the instructions to determine a distance between the vector of the test machine learning model and a vector associated with the one or more machine learning models.

19. The non-transitory computer-readable storage medium of claim 15, wherein the output of the test machine learning model is based on metadata associated with the test machine learning model, the metadata comprising one or a combination of a description tag, a classification of the test machine learning model, and model configurations.

20. The non-transitory computer-readable storage medium of claim 15, wherein the test machine learning model and the one or more machine learning models stored in the database are compared in a cloud environment that is remote from one or more devices in which the test machine learning model can be deployed for actually implementing the test machine learning model.

* * * * *